United States Patent [19]

Walker

[11] 4,097,572
[45] Jun. 27, 1978

[54] METHOD OF FORMING A TUBULAR CONTAINER

[75] Inventor: Grant W. Walker, Sacramento, Calif.

[73] Assignee: Energy Absorption Systems, Inc., Chicago, Ill.

[21] Appl. No.: 712,848

[22] Filed: Aug. 9, 1976

[51] Int. Cl.² ............................ B29C 5/04; B29D 3/02
[52] U.S. Cl. .................................. 264/310; 264/313; 264/334
[58] Field of Search ............... 264/310, 311, 334, 347, 264/326, 219, 313, 336, 337, 338, 267, 316; 249/127, 112; 425/435

[56] References Cited

U.S. PATENT DOCUMENTS

| 1,986,629 | 1/1935 | Fenton | 264/236 |
|---|---|---|---|
| 2,042,536 | 6/1936 | Leguillon | 264/334 |
| 3,012,922 | 12/1961 | Wiltshire | 264/311 |
| 3,099,593 | 7/1963 | Syracuse | 264/337 |
| 3,150,219 | 9/1964 | Schmidt | 264/311 |
| 3,778,206 | 12/1973 | Barratt | 264/311 |
| 3,939,241 | 2/1976 | Powell et al. | 264/334 |

Primary Examiner—Willard E. Hoag
Attorney, Agent, or Firm—Lothrop & West

[57] ABSTRACT

A method of forming a tubular container such as a pipe or a tank includes providing a drum rotatable about an axis with an axially split liner in the drum. The drum and the liner are rotated together about the axis, and a time-setting plastic and reinforcing roving are discharged against the inside of the liner. When the plastic has at least partially set, the liner, plastic and roving are removed from the drum. After further plastic setting, if desired, the liner is removed from the plastic and roving for reuse. Preferably the split in the liner is covered with tape before rotation and is removed thereafter.

2 Claims, 2 Drawing Figures

METHOD OF FORMING A TUBULAR CONTAINER

In my co-pending application Ser. No. 472,190 entitled "Tubular Member And Process Of Forming A Tubular Member" now U.S. Pat. No. 3,973,596 issued Aug. 10, 1976 there is disclosed a method of forming a pipe or tank by introducing plastic and roving lengths into a forming drum rotating about a horizontal axis. When the plastic has somewhat set, it is necessary to remove the plastic and roving element from the permanent, forming drum. This is often attended with considerable difficulty and slows the production of the tubular units.

It is therefore an object of the invention to provide a method of forming a tubular container in such a way as to make only a short-time use of the revolving drum and to provide a way of removing a formed or a partially formed tubular member quite promptly from the forming drum.

Another object of the invention is to provide a method of forming a tubular container in which a small number of auxiliary mechanisms are utilized to speed operations and in which long-time curing or drying or setting of the plastic can be accomplished away from the initial forming drum.

Figure 1:
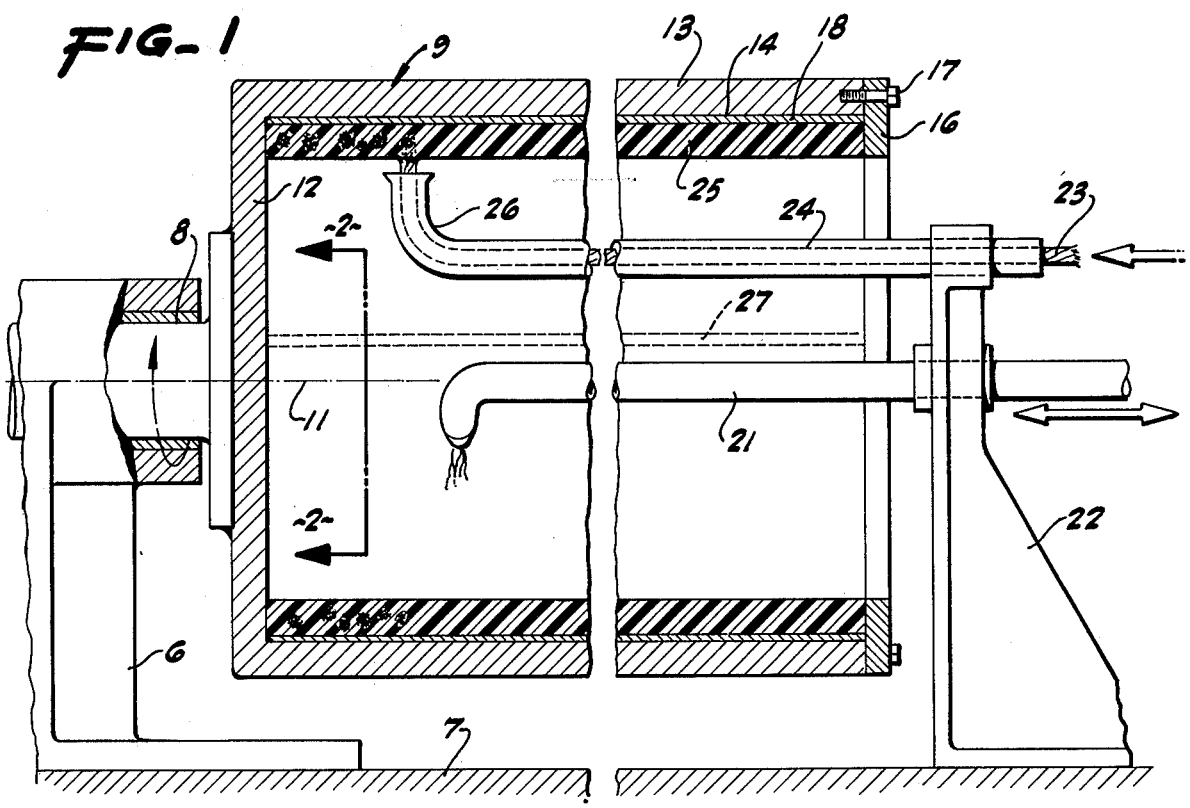
Figure 2:
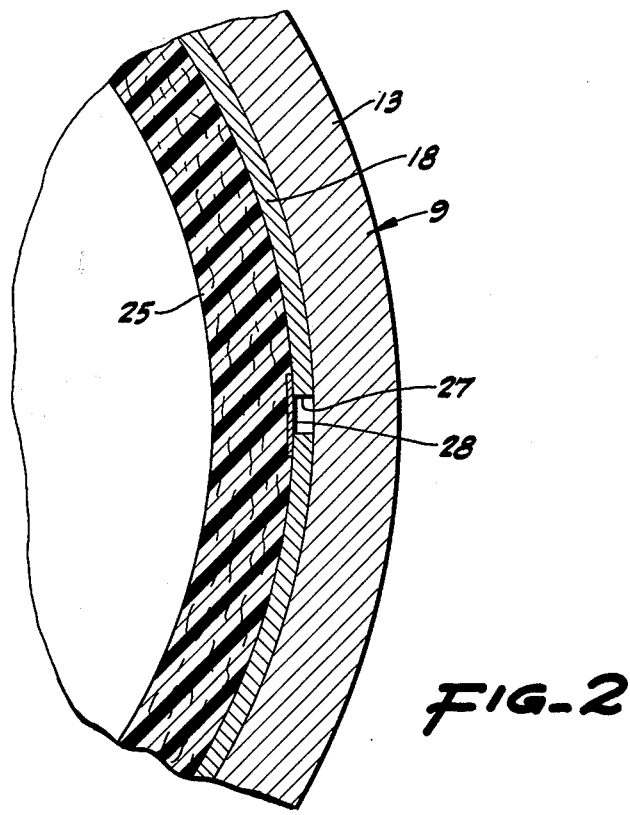

Other objects together with the foregoing are attained in the embodiment of the invention described in the accompanying description and illustrated in the accompanying drawings, in which:

FIG. 1 is a cross-section on a longitudinal axial plane through a drum and forming mechanism adapted to carry out the method of the invention; and FIG. 2 is a partial cross-section to an enlarged scale, the plane of section being indicated by the line 2—2 of FIG. 1.

In one embodiment of the mechanism for carrying out the method, there is provided a frame 6 or stand on a foundation 7 carrying a rotary shaft 8 appropriately driven. At one end of the shaft there is provided a drum 9 concentric about a generally horizontal axis 11. The drum has a closed bottom 12 and a generally circular-cylindrical side wall 13, although the inside surface 14 of the drum wall may be somewhat tapered, being larger at the end remote from the shaft 8. The end of the drum is temporarily closed by an annular ring 16 removably secured in place by bolts 17.

In the use of this device the ring 16 is put into place after there has been specially inserted a thin wall, tubular liner 18 generally circular-cylindrical or slightly tapered and disposed concentric with the axis. The liner itself is of a material that is freely removable from the interior of the drum and is particularly nonadherent thereto. In practice the liner can be made of a composite of a well-cured, time-setting plastic with fiber glass reinforcement to provide a durable, somewhat flexible, long-lived, thin shell.

After the liner has been put into position and the end ring has been fastened tightly, the drum is driven and the interior of the rotating drum is supplied with time-setting, liquid plastic discharged from a pipe 21 mounted on a stationary frame 22 and reciprocated axially. The time-setting plastic is liquid when applied and forms an annulus around the interior of the liner 18, usually being supplied until it achieves a level equivalent to that of the inside diameter of the ring 16. While the plastic is still liquid, there is likewise introduced into the interior of the drum a number of lengths of roving 23 advancing through a pipe 24 which can be reciprocated in the frame 22 just as the pipe 21 is reciprocated axially.

The roving lengths emerge from the bent end 26 of the tube and become adhesively embedded in the rotating plastic and are thus withdrawn from the pipe 24 and are flung into a generally circumferential position embedded in the plastic. After considerable rotation and after many roving lengths have been introduced into the plastic, the plastic tends to set up or harden.

As soon as the plastic has sufficiently stiffened to form a body 25, able to maintain a stable orientation, the rotation of the drum is stopped and the ring 16 is removed by removing the bolts 17. The next operation is to remove as a unit the partially set plastic and embedded roving and the shell or liner 18 surrounding the plastic body 25. This is easily done since the shell slides freely within the drum wall, being assisted by the presence of a parting compound or the like, if desired. The plastic body with roving in it and the shell around it are taken out of the drum and are set to one side, usually with the axis vertical. At this time a duplicate shell can be introduced into the drum and the body forming process can be repeated, while the just-molded body can continue its setting operation. The time-setting of the removed body may occur over a number of hours or even a day or so.

When the body setting is sufficient so that the body and contained roving are very firm, then the liner 18 is removed. To facilitate such removal the liner is originally provided with an axially extending slit 27 therein extending from one end thereof to the other. Thus, in order to remove the liner it is merely necessary to widen the slit somewhat and lift the liner off either axially or (if the liner is sufficiently flexible) simply by opening the slit very widely and taking it away from the remaining body. After that has been accomplished the body can continue to cure or can go into ordinary use, while the liner is returned for subsequent use within the drum.

Prior to inserting the liner into the drum again or just after the liner has been inserted into the drum again, the slit 27 is preferably covered by a strip of tape 28 or the like of sufficient strength to bridge the slit and of sufficient thinness as substantially to continue the interior contour of the liner.

In this way there has been provided an improved method of forming a tubular member in a spinning drum and particularly of withdrawing the member when it is only partially set up so as to release the drum for subsequent use. Adhesion between the removed portions and the drum does not occur, since the liner is nonadhesive with regard to the drum material.

What is claimed is:

1. A method of forming a tubular container consisting of the steps of providing a drum rotatable about an axis and having a wall with an interior surface, disposing an axially split liner within said drum in contact with said wall surface, then rotating said drum and said liner in unison about said axis, then depositing a time-settable liquid matrix within said rotating liner to assume an annular shape and adding lengths of roving to said matrix while leaving the inner surface of said annular shape exposed to the air, then continuing rotation of said drum and liner and matrix and roving for a time until said matrix is at least partially set as a body able to maintain a stable annular shape, then stopping the rotation of said drum and liner and matrix and roving, then axially withdrawing said liner and said matrix and said roving in said maintained annular shape while continuing to leave the inner surface of said matrix exposed to the air, then slightly expanding and removing said liner from said matrix and said roving, and then replacing said removed liner in said drum.

2. A method as in claim 1 in which said liner and matrix and roving after withdrawal from said drum are permitted to stand until said matrix and roving are substantially set prior to removal of said liner therefrom.

* * * * *